United States Patent [19]

Jennings

[11] Patent Number: 4,729,650
[45] Date of Patent: Mar. 8, 1988

[54] REMOVABLE SUNGLASSES FOR USE WITH CONVENTIONAL EYEGLASSES

[76] Inventor: Lucinda K. Jennings, 4022 Densmore Ave., Everett, Wash. 98205

[21] Appl. No.: 38,670

[22] Filed: Apr. 15, 1987

[51] Int. Cl.$^4$ .......................... G02C 9/00; G02C 7/08
[52] U.S. Cl. .................................. 351/47; D16/108; D16/123; 351/41
[58] Field of Search .................. 351/47, 114, 158, 41, 351/57; 2/12, 13; D16/108, 123

[56] References Cited

U.S. PATENT DOCUMENTS

| D. 203,949 | 3/1966 | Dym ...................................... 351/47 |
| 947,636 | 1/1910 | Degges . |
| 1,805,396 | 5/1931 | Havens . |
| 3,023,418 | 3/1962 | Hammond . |
| 3,276,035 | 10/1966 | Jacobson . |
| 3,536,385 | 10/1970 | Johnston . |

FOREIGN PATENT DOCUMENTS 614883 12/1948 United Kingdom .

*Primary Examiner*—Bruce Y. Arnold
*Assistant Examiner*—Kevin Fournier
*Attorney, Agent, or Firm*—H. Albert Richardson, Jr.

[57] ABSTRACT

A pair of removable sunglasses which can be attached to conventional eyeglasses or spectacles. The sunglasses include a pair of lenses joined by a center section which functions as both a hinge and means for attaching the sunglasses to the bridge of the eyeglasses. They also include a pair of opposing side pieces attached to respective lenses by a hinge which are removably attachable to the bows of the eyeglasses.

6 Claims, 6 Drawing Figures

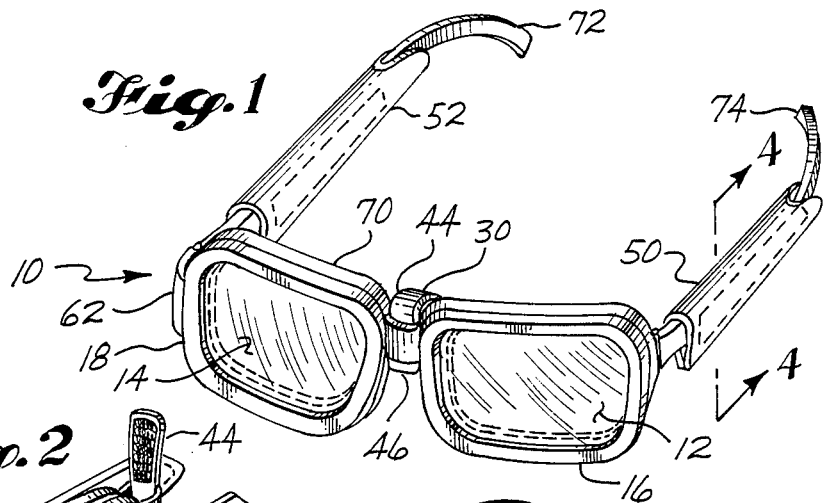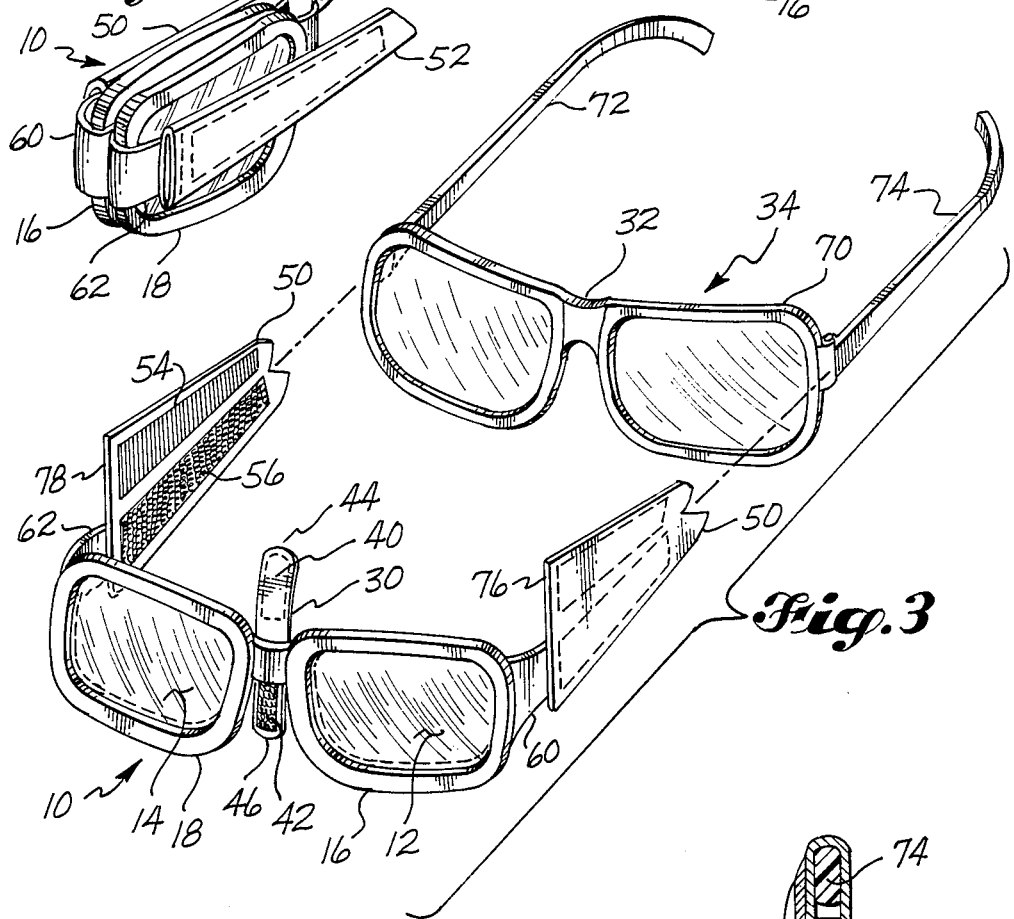

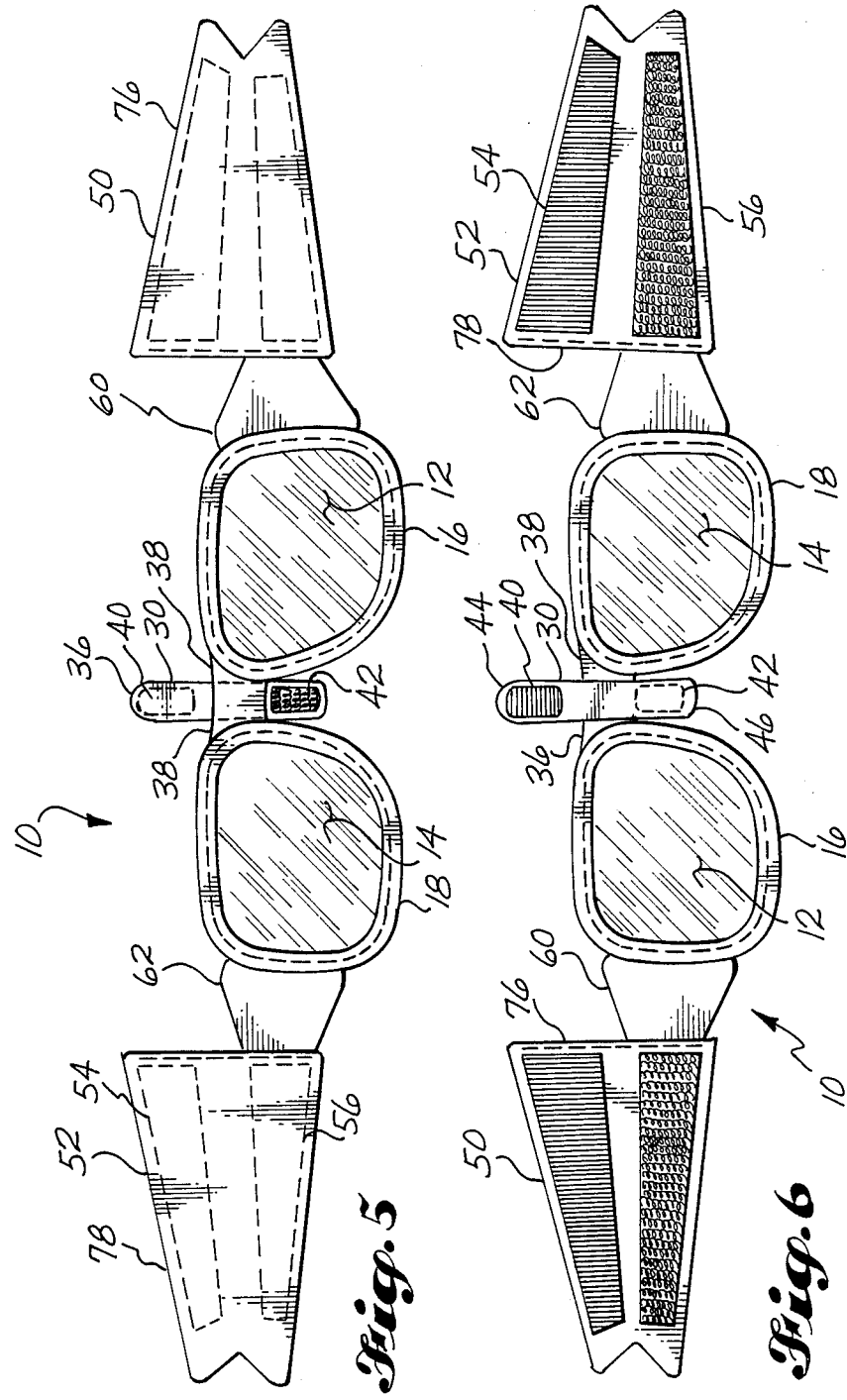

REMOVABLE SUNGLASSES FOR USE WITH CONVENTIONAL EYEGLASSES

BACKGROUND OF THE INVENTION

This invention generally relates to eye protectors or sunglasses and more particularly to a removable pair of sunglasses which can be worn over a common pair of eye glasses or spectacles.

For those who wear glasses regularly or for long periods of time, particularly children, there is a need for a new type of sunglasses. Presently, the choices are limited. One can purchase a pair of prescription sunglasses, but that is an expensive solution. For many children, having to deal with one pair of glasses is difficult enough.

Another solution is to attach a pair of nonprescription protective lenses over the frames of the prescription glasses. Probably the most common type of detachable lenses available are the clip-on type which include a pair of tinted plastic lenses which are joined by a metal or plastic bridge and are held in place against the front of the prescription lenses by a pair of u-shaped clips which extend over the top of the eyeglass frame.

Although these devices usually function satisfactorily, they have a number of disadvantages, particularly for children. First, many people do not consider them very attractive or fashionable. Children today are surprisingly fashion conscious and many of them will simply decline to wear or use an item which they regard as unfashionable.

Secondly, most of these devices cannot stand much abuse and can be broken rather easily in the normal course of use by a child. They are not particularly flexible and will be deformed or broken with any significant bending. Thirdly, they are generally not available in sizes small enough to fit well enough on children's glasses. Finally, depending on the particular design involved there may be some additional risk of injury to the face or the eyes by the clips in the event of facial impact.

Accordingly, it is an object of this invention to provide for an improved pair of removable sunglasses which are relatively inexpensive in comparison to the cost of conventional prescription sunglasses.

It is another object of this invention to provide for a pair of removable sunglasses which are fashionable and attractive and may be manufactured in a variety of styles and of a variety of materials.

It is another object of this invention to provide for a pair of removable sunglasses which are relatively durable and are foldable between the lenses to facilitate storage.

Finally, it is yet another object of this invention to provide for a pair of removable sunglasses which are suitable for use with children's eyeglasses and provide no additional risk of injury in the event of a fall.

SUMMARY OF THE INVENTION

This invention can be broadly summarized as providing for a pair of removable sunglasses adapted to be attached to a pair of conventional eyeglasses having a frame, a centrally located bridge and a pair of bows extending aft from the frame. The sunglasses include a pair of transparent lenses, a center section connecting the lenses and a pair of side pieces each hinged to an associated lens. The center section includes a hinge permitting the glasses to be folded and means for removably attaching the sunglasses to the bridge of the eyeglasses. Also, each of the side pieces includes means for removably attaching the sunglasses to one of the bows.

According to a more detailed aspect of the invention, each lens includes a housing which surrounds the lens and is attached to the center section.

According to another detailed aspect of the invention, the center section includes a pair of opposing flexible tabs, each of which can partially encircle the bridge of the eyeglasses, and a fastener for connecting the tabs.

Finally, according to yet another detailed aspect of the invention, each side piece is foldable from an open to a closed position and includes a fastener for securing it in the closed position.

BRIEF DESCRIPTION OF THE DRAWINGS

FIG. 1 is a frontal perspective view of the subject invention attached to a pair of conventional eyeglasses. Note that the hinge connecting the left side piece (as viewed from the rear) has been removed for clarity.

FIG. 2 is a perspective view of sunglasses as they would appear unfolded.

FIG. 3 is another frontal perspective view of the sunglasses spaced in front of a pair of eyeglasses in which the side sections and center section tabs are in an open position.

FIG. 4 is a sectional view taken at 4—4 of FIG. 1.

FIGS. 5 and 6 show front and rear views, respectively, of the sunglasses as they would appear as if opened into a plane pattern.

DESCRIPTION OF THE PREFERRED EMBODIMENT

The novel features believed to be characteristic of this invention are set forth in the appended claims. The invention itself, however, may be best understood and its various objects and advantages best appreciated by reference to the detailed description below in connection with the accompanying drawings.

In FIGS. 1 through 6 of those drawings a pair of removable sunglasses constructed in accordance with the teachings of the present invention is illustrated and generally designated by the number 10. The glasses include a left-hand lens 12 and a right-hand lens 14. Throughout this description the terms "left" and "right" shall refer to directions as viewed from the rear of the sunglasses as worn. Each of the lenses is preferably made of a tinted, transparent plastic although other appropriate materials might be substituted. Each of the lenses is surrounded by a padded fabric housing which provides comfort and protection for the wearer and some protection for the lenses. The left and right housings are designated with the numbers 16 and 18, respectively. Each housing is assembled from an elongated strip of fabric which has been folded lengthwise to form a tube and enclose a somewhat narrower elongated strip of foam. The foam may be secured in the housing either by sewing or gluing. After the housing is assembled it is wrapped around the associated lens and secured in position by either sewing or gluing as desired.

The lens assemblies are joined by center section 30 which functions both as a hinge to permit the glasses to be folded as shown in FIG. 2. It also provides a means for securing the sunglasses to bridge 32 of a pair of conventional eyeglasses such as those generally designated by the number 34. The center section is assembled in the approximate shape of a cross from two laminated pieces of fabric, tab member 36 and nose member 38. After members 36 and 38 are joined, mated fastener sections 40 and 42 are secured to the upper rear and lower front surfaces, respectively, of the tab member as shown in FIG. 5. Next the ends of nose piece 38 are attached to left- and right-hand lenses 12 and 14 by sewing them to the lens housings. In the preferred embodiment, a loop and hook type fastener such as a Velcro ® has been used but any other type of appropriate fastener that would provide reasonable comfort for the wearer can be substituted.

Left- and right-hand side pieces 50 and 52 are also a laminated assembly made of fabric. Each is assembled from two pieces of fabric which are similar in shape to the earpiece outlines shown in FIGS. 5 and 6, but are enlarged to include a hem allowance. During assembly, a piece of thin foam sheeting having the approximate shape of the upper dotted outlines of FIG. 5 is attached by sewing or gluing it to one of the pieces of fabric. Next the two fabric pieces are sewn together inside out with the foam piece on the outside. Then the assembly is turned inside out placing the foam and the hems on the inside. Finally, mated fastener sections 54 and 56 are attached to the rear of the side pieces either by sewing or gluing. As with the nose piece a loop and hook type fastener is preferred but another type may be substituted. The foam is added to provide some additional rigidity for the side piece and for the comfort of the wearer.

After the earpieces are completed they are joined by sewing to left and right hinges 60 and 62. Each of the hinges is also a laminated assembly made of two pieces of fabric in between which a piece of thin foam sheeting has been secured. Each is assembled in the same way that the side pieces are so that the seam allowance is enclosed in between the two layers. After assembly is complete each of the hinges is sewed to the outer edges of the appropriate lens housing and the lower forward edge of the appropriate earpiece. The hinges can be made more flexible and easier to fold if desired by eliminating the foam layer.

Practically any nylon or synthetic fabric can be used in constructing the sunglasses. Nylon or polyester fabrics work well but any natural or synthetic fabric can be used. As a result a wide variety of style and color variations can be achieved. Also, if the glasses are to be worn simply as an item of decor they can be made with clear lenses rather than tinted ones.

In order to attach the sunglasses to eyeglasses 34, the user merely needs to center them on the front of frame 70, wrap legs 42 and 44 around the bridge so as to overlap fastener sections 40 and 42 on the rear side of the bridge. The fastener can then be secured by compressing it. Next, the side pieces are bent back so as to lie along the outer sides of both 72 and 74. Then upper portions 76 and 78 are rolled over the bows to the inside and the side pieces are closed by pressing the fastener sections together. In this way the bows are secured in the pockets formed within the side pieces and above the closed fasteners as shown in FIG. 4.

Thus it can be seen that the present invention provides for an improved pair of foldable sunglasses which incorporate many novel features and offer significant advantages over the prior art. Although only one embodiment of this invention has been illustrated and described, it is to be understood that obvious modifications can be made of it without departing from the true scope and spirit of the invention.

I claim:

1. A pair of removable sunglasses adapted to be attached to the front of a pair of conventional eyeglasses having a frame with a centrally located bridge and a pair of bows, said sunglasses comprising:
   a pair of transparent lenses;
   a center section connecting each lens and including a hinge permitting the glasses to be folded for storage and means for removably attaching the sunglasses to the bridge in front of the eyeglasses; and
   a pair of side pieces, each hinged to an associated lens and including means for removably securing the sunglasses to one of the bows.

2. The sunglasses of claim 1 wherein each of the lenses includes a housing at least partially surrounding the lens.

3. The sunglasses of claim 1 further including a fabric hinge connecting one of the sidepieces to an associated lens.

4. The sunglasses of claim 1 wherein the means for attaching includes a pair of opposing flexible tabs capable of encircling the bridge and a first fastener attached to at least one of the tabs for connecting them.

5. The sunglasses of claim 1 wherein each sidepiece is foldable between an open and a closed position and includes a second fastener for retaining it in the closed position.

6. A pair of removable sunglasses adapted to be attached to a pair of conventional eyeglasses having a frame with a centrally located bridge and a pair of bows, said sunglasses comprising:
   a pair of transparent lenses, each including a housing which at least partially surrounds the lens;
   a center section connecting each lens and including a fabric hinge permitting the sunglasses to be folded between the lenses for storage, a pair of opposing, flexible tabs capable of encircling the bridge and a first fastener attached to at least one of the tabs for connecting them;
   a pair of opposing sidepieces, each foldable between an open position and a closed position, capable of encircling a bow, and including a second fastener for retaining the sidepiece in the closed position; and,
   a fabric hinge connecting one of the sidepieces to an associated lens.

* * * * *